No. 687,546. Patented Nov. 26, 1901.
A. SINCLAIR.
VARIABLE SPEED GEAR.
(Application filed Feb. 23, 1901.)
(No Model.) 2 Sheets—Sheet 1.
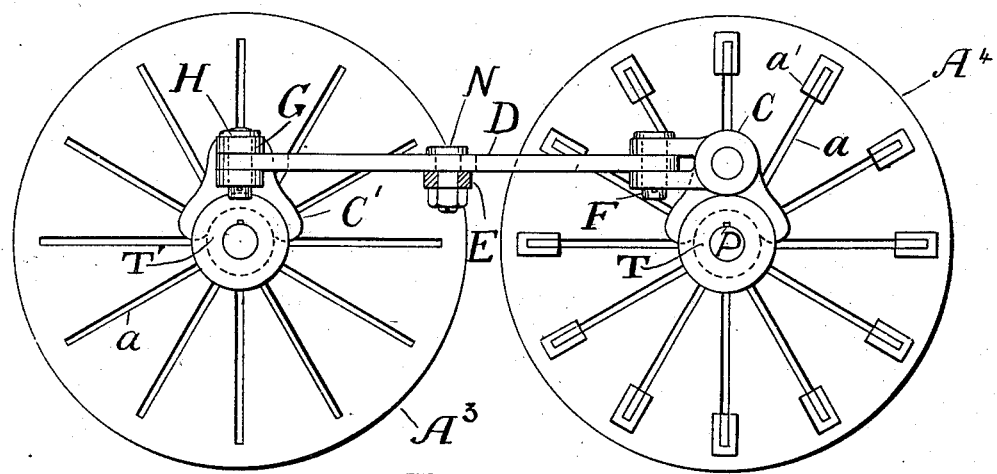
Fig. I.
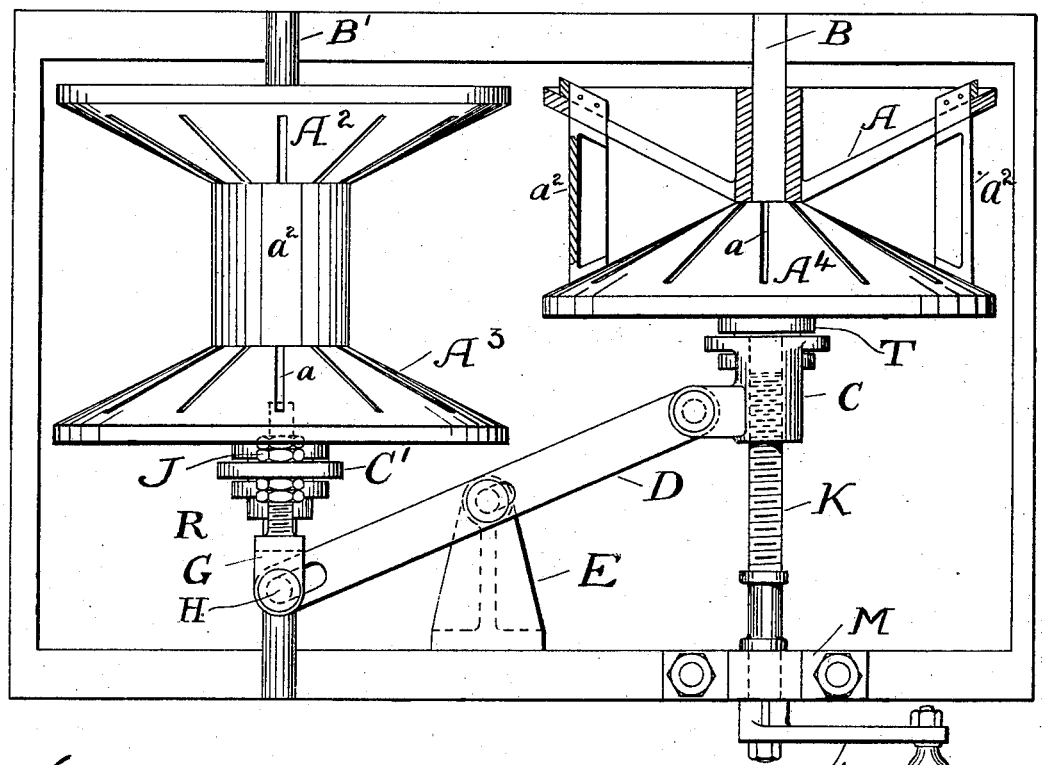
Fig. II.
Witnesses Inventor
Arthur Sinclair
THE NORRIS PETERS CO., PHOTO-LITHO., WASHINGTON, D. C.

No. 687,546. Patented Nov. 26, 1901.
A. SINCLAIR.
VARIABLE SPEED GEAR.
(Application filed Feb. 23, 1901.)
(No Model.) 2 Sheets—Sheet 2.
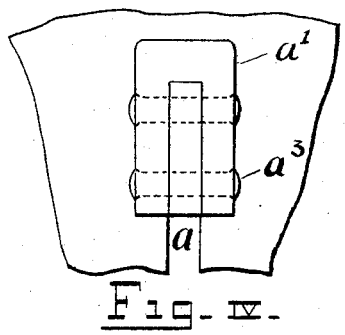
Fig. IV.
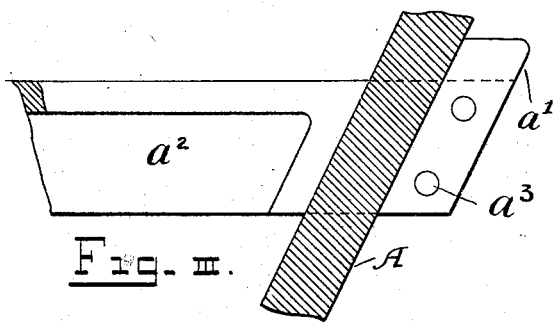
Fig. III.
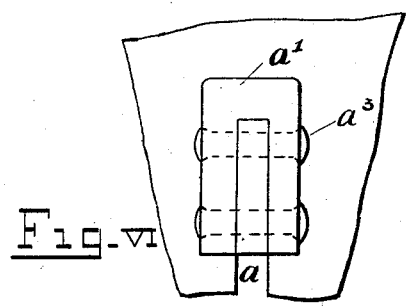
Fig. VI.
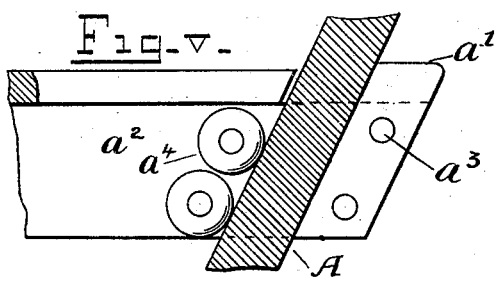
Fig. V.
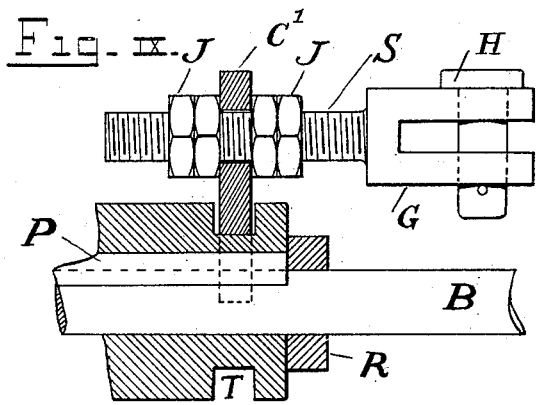
Fig. IX.
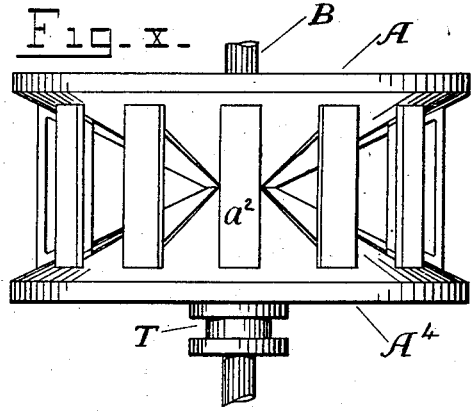
Fig. X.
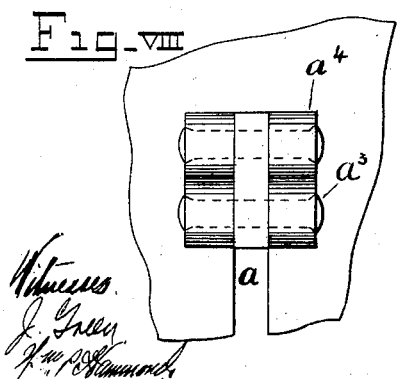
Fig. VIII.
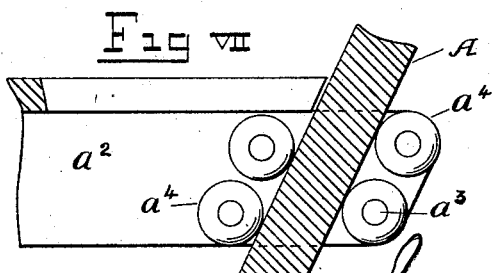
Fig. VII.
THE NORRIS PETERS CO., PHOTO-LITHO., WASHINGTON, D. C.

UNITED STATES PATENT OFFICE.

ARTHUR SINCLAIR, OF EDINBURGH, SCOTLAND, ASSIGNOR OF ONE-HALF TO ALEXANDER WOODCOCK MACKENZIE, OF EDINBURGH, SCOTLAND, AND ROBERT PATERSON, OF GLASGOW, SCOTLAND.

VARIABLE-SPEED GEAR.

SPECIFICATION forming part of Letters Patent No. 687,546, dated November 26, 1901.

Application filed February 23, 1901. Serial No. 48,476. (No model.)

*To all whom it may concern:*

Be it known that I, ARTHUR SINCLAIR, a subject of the King of Great Britain and Ireland, and a resident of No. 10 Panmure Place, Edinburgh, Scotland, have invented new and useful Improvements in Variable-Speed Gear or Transmission Mechanism for Motor-Vehicles and other Machinery, of which the following is a specification.

This invention relates to improvements in variable-speed gear or transmission mechanism for motor-vehicles or for other machinery where such gear is required.

In carrying out my invention I employ two pulleys over and between which the driving-belt passes, the arrangement being such that that part of the surface of the pulley which is in contact with the belt can be increased or decreased in diameter at the will of the attendant by simply operating a screw or equivalent gear, so that any desired ratio between the driving and driven pulleys, from their highest ratio to their lowest ratio, can be obtained.

For motor-vehicles driven by belt my invention is specially applicable, because one belt does the duty of the usual three belts as required for obtaining the usual three fixed varying speeds, so that not only does the one belt in accordance with my improvements do the duty of the three ordinary belts, but any desired intermediate speeds can be obtained, so that the engine may always run at its normal speed, which is always desirable in motor-vehicles—that is to say, there is no necessity to reduce the firing when it is required to obtain a particular speed other than that of the ordinary three fixed speeds. Each of the said pulleys consists of two cone-shaped plates, one of which is fixed on the shaft, the other being capable of moving to and from the fixed plate. Between these plates bars or dogs are arranged in such a manner that they can be moved from the center or hub of the cone-shaped plates to near the periphery thereof, the said bars forming the varying-sized surface of the pulley for the belt to run on.

The accompanying drawings illustrate a mechanism applicable to a motor-car.

Figure I is a side elevation, and Fig. II is a plan of same, partly in section, showing the belt-bearing surface of the one pulley expanded to its largest diameter, the belt-bearing surface of the other pulley being shown contracted to its smallest diameter. Figs. III, IV, V, VI, VII, and VIII are detail views, on a larger scale, illustrating the attachment of the dogs or bars to the cone-shaped plates, as hereinafter described. Fig. IX is a detail view, partly in longitudinal section, illustrating a device for tightening or adjusting the belt. Fig. X is a plan of the pulley shown in sectional plan at the right-hand side of Fig. II.

The two cone-shaped plates $A$ $A^4$ form the sides of the one pulley. The plate $A$ is keyed fast upon the shaft $B$, but the plate $A^4$ is capable of moving to and from the said plate $A$ upon the shaft $B$ by means of the clutch member $T$, Fig. X, formed on the cone-shaped plate, and the clutch-nut $C$, carried on the screw $K$, a key being provided on the shaft to take up the turning effect. According to the direction in which the screw $K$ is turned by the handle $L$, Fig. II, the plate $A^4$ is moved to or from the other plate $A$. By means of this movement the bars $a^2$, which constitute the belt-bearing surface, are drawn out or in, so as to increase or decrease the diameter of the belt-bearing surface. These motions may be effected during the rotation of the pulleys—that is to say, while the machine is running. The arrangement and construction of the said moving bars $a^2$ are as follows: Each of the plates $A$ $A^4$ and $A^2$ $A^3$ has a number of radial slots $a$ formed therethrough to receive the bars $a^2$, which form the belt-bearing surface of the pulleys, the said bars being capable of sliding up and down in the said slots, being held in position in the manner as shown in the enlarged detail views, Figs. III and IV, and in the modifications shown in Figs. V to VIII. Fig. III is a section through the cone-shaped pulley-plate $A$, showing a bar $a^2$ in position, and Fig. IV an end view of same. (See also the right-hand side of Fig. II.) The ends of the bars $a^2$ are passed through the slots $a$ in the cone-shaped pulley-plate, the protruding ends of the said bars being enveloped by the U-shaped pieces or guides $a'$, which bear against the outside of the pulley-plate A to keep the bars $a^2$ in their proper position between the two cone-shaped plates of each pulley, rivets $a^3$ being passed through the two sides of the said U-shaped piece $a'$ and through the projecting ends of the bars $a^2$. As shown in Fig. II and in enlarged detail, Fig. III, the bars are constructed with a shoulder or web $a^2$, which bears as a guide against the other side of the cone-shaped plate A. The top part of the bar may be of a similar formation, as shown, in order to give the required bearing-surface for the belt. A simultaneous movement in the opposite direction is given to the cone-shaped plate $A^3$, Fig. II, by means of the pivoted lever D, fulcrumed upon the pin N, carried by the bracket E, Figs. I and II. The said plate $A^3$ is provided with a similar clutch to that described with reference to plate $A^4$, except that an arrangement is provided with regard to the plate $A^3$, so that the pulley formed by the plates $A^2$ and $A^3$ may be increased or decreased in diameter independently of the movement transmitted by the lever D when so desired—that is to say, when, for example, the belt may be required to be tightened or slackened. This I effect by providing the clutch member T' of the cone-shaped plate $A^3$ with an adjusting arrangement. (Shown in enlarged detail, Fig. IX.) The one end of the lever D is connected to the forked end G of the screw S by means of the pin H. The clutch member T' of the cone-shaped plate $A^3$ is set at the required position on the shaft B' to or from the opposite cone-shaped plate $A^2$ by means of the adjusting of the clutch-die C' on the screw S and fixed by means of the adjusting-nuts J.

A collar R, Figs. II and IX, is preferably fixed on the shafts B and B' to prevent any movement of the pulleys when they have been expanded to their largest diameters, thus preventing any undue strain on the different parts of the mechanism.

Figs. V and VI show a modification in the means of mounting the bars $a^2$, which consists in the employment of two rollers $a^4$ on each side of the bar and which are secured in position by pins passing through the rollers and through the bar.

Figs. VII and VIII show a modification in which a set of rollers run on both sides of the cone-shaped plate.

In lieu of the screw K for operating the pulleys, as shown in the drawings, I may employ any equivalent of the screw, such as a graduated quadrant and lever, the said quadrant and lever being arranged in any suitable position on the motor-car or machine to which the pulleys are applied.

The particular framing as shown in the drawings is merely to illustrate the machine in which the pulleys and gear operate, it being obvious that the particular mode of mounting the gear will be in accordance with the kind of machine to which the invention is required to be applied.

Having thus described my invention, the following is what I claim as new and desire to secure by Letters Patent:

1. In a variable-speed-transmitting mechanism, the combination of a pair of cone-shaped plates A $A^4$ having radial slots $a$, mounted point to point on a shaft B, and capable of relative adjustment one toward or from the other; a series of parallel belt-bearing bars $a^2$, guided by their ends in the radial slots $a$, and having near their ends bearing members which rest on the oblique faces of the cone-shaped plates A; and means for adjusting one of said cone-shaped plates toward or from the other, substantially as described.

2. The combination of two expansible pulleys, each consisting of a pair of radially-slotted conical plates A $A^4$; $A^2$ $A^3$; and radially-movable belt-bearing bars $a^2$; shafts B B' on which said pulleys are mounted; clutch members T T' on the movable plates $A^4$ $A^3$, clutch-slides C C' engaged therewith; a connecting-lever D pivoted at its respective ends to the clutch-slides C and C' to communicate reverse movement from one to the other; and a screw K for moving one of said clutch-slides, substantially as set forth.

3. The combination of the paired radially-slotted conical plates A $A^4$ and $A^2$ $A^3$; radially-movable belt-bearing bars $a^2$ mounted in the radial slots $a$ of said plates; clutch members T T', slides C C' connecting lever D and screw K for communicating simultaneous movement to the plates $A^4$ and $A^3$; and the adjustable connection G S J between the lever D and slide C' for imparting independent adjustment to the plate $A^3$, substantially as and for the purposes explained.

ARTHUR SINCLAIR.

Witnesses:
H. PERCY GIBBONS MOREY,
DAVID R. MENZIES.